US006453268B1

(12) United States Patent
Carney et al.

(10) Patent No.: US 6,453,268 B1
(45) Date of Patent: Sep. 17, 2002

(54) METHOD, SYSTEM, AND PROGRAM FOR MONITORING A DEVICE WITH A COMPUTER USING USER SELECTED MONITORING SETTINGS

(75) Inventors: Dennis Michael Carney, Louisville; Linda Sue Liebelt, Boulder; Ryan Hoa Nguyen, Westminster, all of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,358

(22) Filed: Jul. 7, 1999

(51) Int. Cl.[7] .................................................. G06F 3/05
(52) U.S. Cl. ........................................ 702/186; 702/64
(58) Field of Search ...................... 717/8, 4, 1; 714/11; 709/328, 218, 224; 707/102; 395/856; 702/64, 186

(56) References Cited

U.S. PATENT DOCUMENTS

| | | | |
|---|---|---|---|
| 5,557,748 A | | 9/1996 | Norris |
| 5,602,974 A | | 2/1997 | Shaw et al. |
| 5,678,044 A | | 10/1997 | Pastilha et al. |
| 5,692,111 A | | 11/1997 | Marbry et al. |
| 5,699,495 A | | 12/1997 | Snipp |
| 5,706,508 A | | 1/1998 | Chen et al. |
| 5,708,812 A | | 1/1998 | Van Dyke et al. |
| 5,710,885 A | | 1/1998 | Bondi |
| 5,717,841 A | | 2/1998 | Farrell et al. |
| 5,742,825 A | | 4/1998 | Mathur et al. |
| 5,768,483 A | | 6/1998 | Maniwa et al. |
| 5,799,206 A | * | 8/1998 | Kitagawa et al. ........... 395/856 |
| 5,819,112 A | | 10/1998 | Kusters |
| 5,845,058 A | | 12/1998 | Shaw et al. |
| 5,848,231 A | | 12/1998 | Teitelbaum et al. |
| 5,852,744 A | | 12/1998 | Agatone et al. |
| 5,898,823 A | | 4/1999 | Sorkin et al. |
| 6,212,478 B1 | * | 7/2001 | Alvarado ...................... 702/64 |
| 6,256,635 B1 | * | 7/2001 | Arrouye ...................... 707/102 |
| 6,256,667 B1 | * | 7/2001 | Wanghlander .............. 709/218 |
| 6,256,680 B1 | * | 7/2001 | Kim ........................... 709/328 |
| 6,256,750 B1 | * | 7/2001 | Takeda ......................... 714/11 |
| 6,256,771 B1 | * | 7/2001 | O'Neil ........................... 717/1 |
| 6,256,774 B1 | * | 7/2001 | O'Leary et al. ................ 717/4 |
| 6,256,781 B1 | * | 7/2001 | Okajima ......................... 717/8 |
| 6,269,401 B1 | * | 8/2001 | Fletcher et al. ............. 709/224 |

OTHER PUBLICATIONS

Network Working Group Remote Network Monitoring Management Information Base by S. Waldbusser– Carnegie Mellon University– Feb. 1995 RFC1757 pp. 1–91.*
McLaughlin III, Leo J. Line Printer Daemon Protocol. Network Printing Working Group, rfc 1179, Aug. 1990 [online], [Retrieved on Jun. 2, 2000].
Jacobs, John. Windows NT Printing: Flow of Control. Microsoft TechNet, vol. 4, Issue 9, Sep. 1999 [online], [retrieved on Nov. 7, 1999]. Retrieved from the Internet.<URL: http://technet.microsoft.com/cdonline/content/complete/windows/winnt/winntas/technote/teroubleshooting..>.
Microsoft Corporation. Windows NT Printing Model. Microsoft Corporation, (c) 2000 [online], [retrieved on Jun. 2, 2000]. Retrieved from the Internet <URL: http://msdn.microsoft.com/library/winresource/dnwinnt/S83B1.HTM> [Available on the Internet before 12/99].
Microsoft Corporation. Windows NT Printer Drivers. Microsoft Corporation, (c) 2000 [online], [retrieved on Jun. 2, 2000] [Available on the Internet before 12/99].

* cited by examiner

Primary Examiner—Marc S. Hoff
Assistant Examiner—Felix Suarez
(74) Attorney, Agent, or Firm—David W. Victor; Konrad Raynes Victor & Hann LLP

(57) ABSTRACT

Disclosed is a method, system, and program for determining monitoring settings for a computer monitoring a device. A set of monitoring frequency values is provided for a user to select. A user selected monitoring frequency value is received and used to determine at least one polling interval that defines a period between polling operations from the computer to the agent device. The polling interval value is a different value from the user selected monitoring frequency.

43 Claims, 5 Drawing Sheets

| Tuning Control | High | Above Average | Average | Below Average | Low |
|---|---|---|---|---|---|
| Polling Mode: Time between polls if no jobs. | 15 sec | 22.5 sec | 30 sec | 1 min | 2 min |
| Polling Mode: Time between polls if job on port. | 2.5 sec | 3 sec | 3.6 sec | 6 sec | 12 sec |
| Polling Mode: Time between polls if job not at printer. | 11 sec | 11 sec | 11 sec | 15 | 24 sec |
| Critical alert polling | 5 sec | 5 sec | 5 sec | 10 sec | 20 sec |
| Not receiving traps, no jobs | 3 min | 4.5 min | 6 min | 12 min | 24 min |
| Not receiving traps, jobs active | 15 sec | 22.5 sec | 30 sec | 1 min | 2 min |
| Polling Mode: Number of consecutive polls without change in status before do slow poll mode. | 100 | 50 | 30 | 12 | 5 |
| Polling Mode: Number of job polls without a printer poll before do printer poll. | 50 | 75 | 100 | 200 | 400 |
| Job cancel handle, maximum number of attempts. | 12,000 | | | | |

FIG. 3

METHOD, SYSTEM, AND PROGRAM FOR MONITORING A DEVICE WITH A COMPUTER USING USER SELECTED MONITORING SETTINGS

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System and Program for Detecting Communication Code Information," to Dennis Michael Carney, Charles David Johnson, Ryan Hoa Nguyen, having application Ser. No. 09/398,251;

"Method, System, and Program for Monitoring a Device to Determine a Power Failure at the Device," to Dennis Michael Carney, having application Ser. No. 09/349,056; and "Method, System, and Program for Establishing Network Contact," to Dennis Michael Carney and Ryan Hoa Nguyen, having application Ser. No. 09/348,966.

BACKGROUND OF THE INVENTION

1. Field of the Invention

The present invention relates to a method, system, and program for monitoring a device with a computer using a user selected setting and, in particular, monitoring printers in a network.

2. Description of the Related Art

Network printing systems generally comprise an assemblage of different printers, client computers, servers, and other components connected over a network. A network administrator or user may want to monitor the status of print jobs being printed or the general operational status of the printer. A computer may monitor a remote printer over a network using a network protocol, such as SNMP or TCP/IP, or a line connection such as a parallel port connection. Current printer software includes a print monitor component to monitor printer operations. For instance in the Microsoft Windows 95/98 systems, the user may display a queue of print jobs for the printer and a current status of the print jobs. The status usually indicates whether a particular queued job was sent to the printer and its status.

One print monitor protocol is the Line Printer Daemon (LPR) protocol, which is a component of the TCP/IP network protocol. LPR is used to communicate with printers across the network. LPR runs by executing a daemon on the host computer, which is then used to transmit commands, print jobs and other information to the printer and receive data and information from the printer. The LPR protocol allows a client application on one computer to send a print job to a print spooler service on another computer. The LPR daemon monitors a printer port to which it is assigned by "listening" for messages from the client. The host computer would send a print command to the LPR daemon, which would then execute the command and communicate with the printer to cause the printer to follow the command. The LPR protocol includes a command to request the state of the printer, such as pages printed, queued jobs, etc. However, LPR is not capable of providing detailed error status information back to the client application.

Client computers may also communicate with network printers using the Simple Network Management Protocol (SNMP). A computer managing a printer may use the SNMP protocol to control the operation of the managed printer and determine job and print status for the printer. SNMP provides for a limited set of operations, including the get and set commands which, respectively, allow the managing computer to retrieve data and configure the printer. These commands may be used to monitor printer operations. Another SNMP command is the "trap" command which causes the managed agent to send an event notification to the management system or printer manager identifying the occurrence of conditions such as threshold that exceeds a predetermined value. The managing computer registers a trap by writing information to the managed agent, which causes the managed agent to notify the registering computer of the event indicated in the registration.

SNMP is advantageous as a communication protocol because neither the agent nor manager rely on the other to continue operating. Thus, one may fail, and the other would carry on. SNMP further does not require the establishment of a communication path prior to the transmission of data. As a result, with SNMP, there is no guarantee that a transmission was received. Although most messages do transmit successfully, those that do not cannot be retransmitted. On the other hand, SNMP's simplicity and connectionless communication also produce a degree of robustness. Neither the manager nor the agent relies on the other for its operation. Thus, a printer manager may continue to function even if the printer fails.

With the above protocols, such as TCP/IP, SNMP, LPR, etc., a printer manager may monitor the operation of a remote printer. However, many of the current printer monitoring systems are not flexible and do not provide a wide range of settings that may be tailored to a users goals and system needs. Thus, there is a need in the art for an improved system for controlling printer monitor operations.

SUMMARY OF THE PREFERRED EMBODIMENTS

To overcome the limitations in the prior art described above, preferred embodiments disclose a method, system, and program for determining monitoring settings for a computer monitoring a device. A set of monitoring frequency values is provided for a user to select. A user selected monitoring frequency value is received and used to determine at least one polling interval that defines a period between polling operations from the computer to the device. The polling interval value is a different value from the user selected monitoring frequency.

In further embodiments, a base polling interval is determined that corresponds to a base monitoring frequency value in the set. A separate polling interval is then determined for each monitoring frequency value in the set, other than the base monitoring frequency. The polling interval corresponding to the selected monitoring frequency value is used to determine the period between polling operations.

In still further embodiments, there are multiple polling interval types associated with different operational states. In such case, different polling intervals are associated with the different polling interval types. An operational state is determined with respect to the computer and device. The polling interval type corresponding to the determined operational state is then determined. Determining the polling interval comprises determining the polling interval for the polling interval type.

Preferred embodiments allow a user to select a monitoring frequency value. This user selected monitoring frequency value is then used to determine a polling interval between a computer and a network device, such as a printer. If there are numerous different polling interval types for various types of operational states, e.g., an active print job at the printer, no print job sent, no traps received when there is a print job, no traps received when there is no print job, then the user selected monitoring frequency value may be used to determine the corresponding polling interval to use. In this way, the user selects a readily understandable monitoring frequency value that corresponds to a user goal to lower network traffic or increase the timeliness of status information. This user selected value is then used to determine specific settings for polling operations that would otherwise be difficult to explain to the user.

Further, the user selected monitoring frequency value is preferably readily understood by the user, whereas the actual polling intervals selected according to the user selected frequency may be at a level of detail that is incomprehensible to the user. In such case, shielding the user from having to select values for numerous specific operations, which the user may not comprehend, let alone understand the interrelations, reduces the likelihood that the user would select incompatible or nonsensical settings.

BRIEF DESCRIPTION OF THE DRAWINGS

Referring now to the drawings in which like reference numbers represent corresponding parts throughout:

FIG. 3 illustrates a table of polling interval values in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
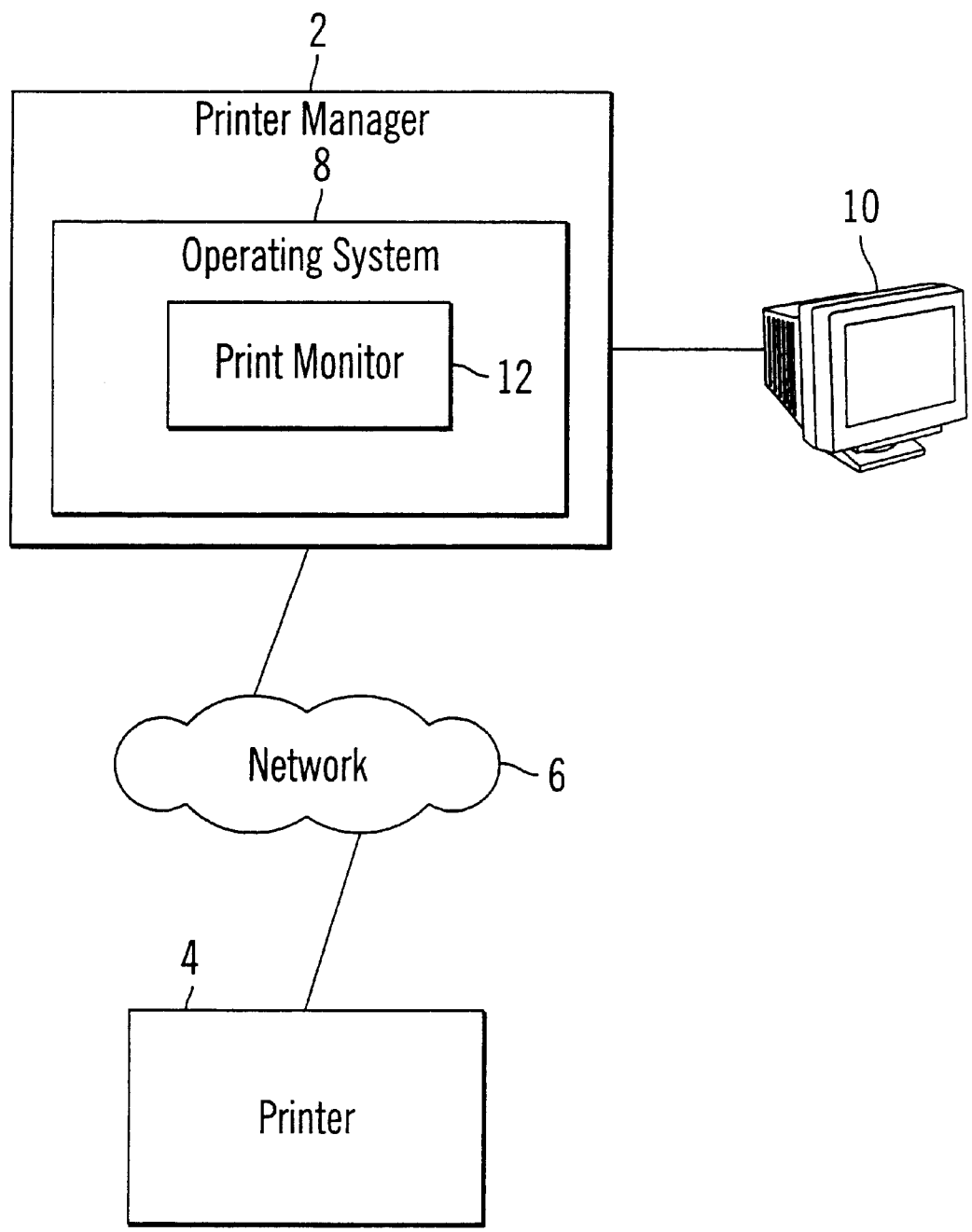
FIG. 1 is a block diagram illustrating a computing environment in which preferred embodiments of the present invention are implemented.

FIG. 1 illustrates a computing environment in which preferred embodiments of the present invention are implemented. A printer manager 2 is in communication with a printer 4 via a network 6. The network 6 may be comprised of any suitable network architecture known in the art, such as LAN, Ethernet, WAN, System Area Network (SAN), Token Ring, Local Talk, TCP/IP, the Internet, etc. Alternatively, there may be separate and different networks between the printer manager 2 and the printer 4.

The printer manager 2 is preferably comprised of a computer, either a client or server, that manages printer operations over a network, such as performing spooling and queuing for print jobs. The computer 2 may be any computer device known in the art, such as a desktop computer, laptop computer, workstation, mainframe, server, personal digital assistant (PDA), etc. The computer 2 would include an operating system 8 such as AIX, OS/390, UNIX, OS/2, MVS, WINDOWS NT, 95/98, LINUX, etc. The printer manager 2 may also include software to allow a network administrator or user to manage network printers, such as the IBM Network Printer Manager software solutions to submit and monitor print jobs, and perform other network printer manager functions. Attached to the printer manager 2 is a display monitor 10, which may be comprised of any computer display device known in the art. An input device (not shown) would also be provided with the printer manager 2 to allow a systems administrator or other user to enter data into the printer manager 2. This input device may be comprised of any input means known in the art, including a mouse, keyboard, touch screen display, voice activated input, electronic pen, etc.

The printer 4 may be any printer, plotter, three dimensional model builder or other similar output device known in the art. In preferred embodiments, the printer manager 2 and printer 4 includes include a network card and one or more ports for intercommunication over the network 6. The printer manager 2 would transmit print jobs to the printer 4 for printing in a manner known in the art.

In preferred embodiments, the printer manager 2 and printer 4 may communicate using the Simple Network Management Protocol (SNMP), or any other suitable network protocol known in the art, such as TCP/IP, LPR, etc. The SNMP protocol is described in Request for Comments No. 1157 (May 1990), entitled "A Simple Network Management Protocol (SNMP)," and No. 1759 (March 1995), entitled "Printer MIB," which documents are incorporated herein by reference in their entirety. The SNMP protocol provides for the interoperability of different devices communicating over a TCP/IP network, such as the Internet.

In preferred embodiments, the printer manager 2 would communicate with the printer 4 via a port, and monitor that port for printer communications. Likewise, the printer 4 would dedicate a port for communicating with the printer manager 2 in a manner known in the art, such as the SNMP art.

The printer manager 2 further includes a printer monitor program 12 component which is used to communicate with the printer 4, and perform operations such as sending print jobs to the printer and monitoring printer status. The printer monitor 12 would incorporate the communication protocol, such as SNMP, to communicate directly with the printer 4 to perform the printer manager functions.

Those skilled in the art will appreciate that network protocols, e.g., Hypertext Transfer Protocol (HTTP), Data Link Control (DLC), etc., other than SNMP, may be used. Moreover, the printer manager 2 and printer 4 may be capable of communicating using one of multiple network protocols.

Allowing the User to Configure Printer Monitor Settings

In preferred embodiments, a user or network administrator is allowed to make general printer monitor selections, which are then used to automatically generate specific settings of printer monitor operations of which the user is generally unaware. Given the number and complexity of different printer monitor operations that may occur, many prior art vendors provide default settings that the user cannot modify. However, preferred embodiments provide the user a level of indirect control over print monitor 12 setting operations without overburdening the user with complicated details about such operations.

Figure 2A:
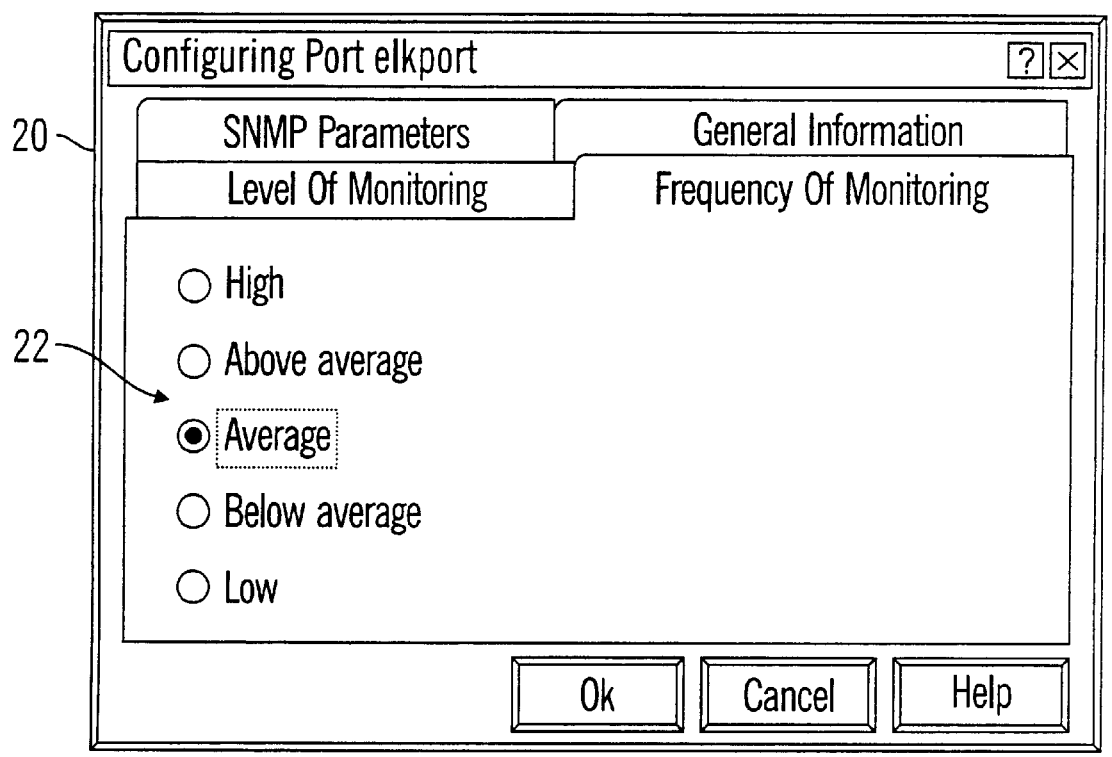
FIGS. 2a, b illustrate GUI panels displayed on a computer monitor in accordance with preferred embodiments of the present invention.
Figure 2B:
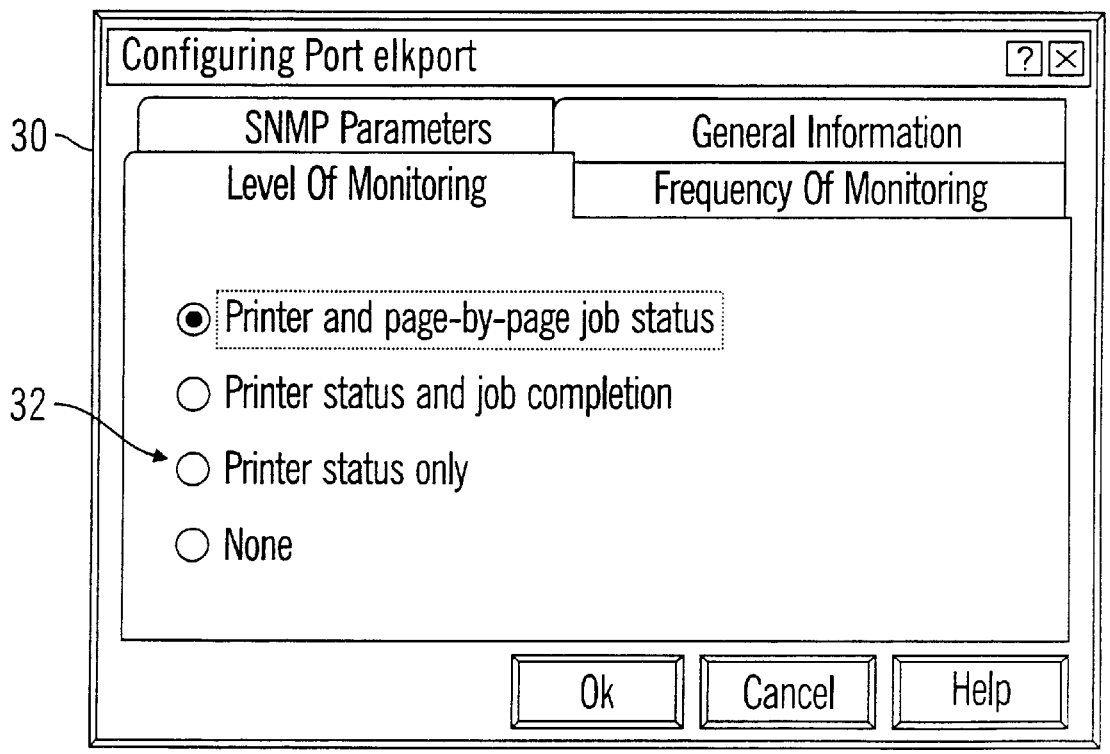

FIGS. 2a and 2b illustrate a frequency of monitoring 20 and level of monitoring 30 graphical user interface (GUI) panels displayed on the monitor 10 in which the user may select options to affect print monitor 12 settings. With the level of monitoring 20 GUI in FIG. 2a, the user may select one of five general values 22 indicating the frequency of monitoring, including High, Above Average, Average, Below Average, and Low. The frequency of monitoring values 22 allow the user to control how often the print monitor 12 communicates with the printer 4 over the network to determine the status of print jobs and the printer. Although selecting a High value may produce more up-to-date and frequent status information, this selection also causes an increase in network traffic and increased processing cost at both the printer manager 2 and printer 4 to process the increased polling operations to request printer status information. The lower frequency selections, such as Below average or Low may reduce network traffic and the collateral burden on the network devices, but result in less accurate and outdated status information.

The preferred embodiments allow the user to decide which is preferred, more accurate status information or reduced network traffic. The generalized setting the user selects is then used to determine specific print monitor 12 operations. This allows the user to control generally the frequency of monitoring, without burdening the user with the details of the specific operations affected by such selection.

In the level of monitoring GUI 30 illustrated in FIG. 2b, the user may select the level of monitoring. There are two types of monitoring, job monitoring and printer monitoring. A print job may be monitored on a page-by-page basis or on a job completion basis. The preferred level of monitoring 30 GUI provides four levels of monitoring from which the user may select: (1) Printer and page-by-page job status; (2) Printer status and job completion; (3) printer status only; and (4) None. For instance, by selecting the second level of monitoring, the user would reduce network traffic significantly, but sacrifice timeliness of status information, such as the current number of pages that have printed.

The user's selections with respect to both the frequency of monitoring 20 and the level of monitoring 30 are used together to determine the selection for specific print monitor 12 operations without burdening the user with the details of such specific operations. In this way, the user may select a general value for both the frequency and level of print monitor 12 operations and then the print monitor 12 would use this value to select further values for specific print monitor operations. This increases the likelihood that the user will understand how to use the configuration options and reduces the likelihood that the user will inadvertently select inconsistent or nonsensical values for the more specific print monitor 12 operations.

FIG. 3 illustrates a table 50 the print monitor 12 would access in a memory of the printer manager 2 to determine settings to use for specific print monitor operations dependent on the print monitor settings the user selected in the GUIs 20, 30 in FIGS. 2a, b. Tuning controls 52, 54, 56, 58, 60, 62, and 64 concern different print monitoring functions. For each tuning control, a set of polling intervals are provided corresponding to the monitoring frequency values that the user may select. The polling intervals get smaller as the monitoring value increases because smaller polling intervals means more frequent polling and monitoring. The user selected frequency monitoring level, i.e., high, above average, average, below average, low, controls the selection of the polling interval for a tuning control. In preferred embodiments, the print monitor 12 would create table 50 upon installing a printer within the printer manager 2. In this way, many of the values generated into the columns for each tuning control in table 50 may be tailored toward the printer 4 being monitored and the level of monitoring the user selects. Further, the print manager 2 may maintain a separate table 50 for each installed printer 4, including values specific to that type of printer 4.

The table 50 provides the following tuning controls. Polling mode 52 indicates the amount of time between polls when there are no active print jobs at the printer 4. The printer monitor 12 would perform such polling to determine printer status, e.g., if the printer is off-line, out of paper, out of toner, cover open, etc. Such polling is useful for printers that do not support traps or that do not provide status information on the occurence of an event for which status information is maintained. Further, even if the printer 4 is instructed to send traps on the occurrence of such printer events, the trap mechanism may not be functioning properly. For instance, the trap mechanism may not function properly if the printer was turned off or the trap registration was lost or corrupted. Still further, even if a printer supports traps, the printer may only provide traps to a limited number of connected printer managers. Thus, certain attached printer managers that exceed the maximum number of printer managers may not receive any traps and would not have the same status information as other printer managers receiving traps. Polling can thus supplement status information for those printers that support trapping but where trapping is failing to provide complete status information.

The polling mode 54 indicates the amount of time between polls if a job is active on the port in the printer manager 2 providing communication with the printer 4. These values are preferably less, i.e., more frequent polling, than those for polling mode 52 where there is no active print job. If the user has specified a level of monitoring in GUI window 30 for a page-by-page status, then the value in the average column for polling mode 54 may be set to the average time for a page to print on the specific printer 4. In this way, the print monitor 12 will poll for each page to print to provide status on a page-by-page basis. In preferred embodiments, the other column values above and below "Average", would be set relative to the determined value for "Average." Note that if the level of monitoring was job completion, then the print monitor 12 would preferably monitor less frequently than if the level of monitoring was on a page-by-age basis. Further, if the user selected a level of monitoring 30 of "Printer status only," then there would be no polling for polling mode 54, as the print monitor 12 is not configured to monitor print jobs.

Still further, the values for polling mode 54 may also be dependent on the settings selected for the monitored print job. For instance, if the print job specifies to print on both sides (duplex), then the values for polling mode 54 would be higher, i.e., monitoring at lower frequencies. The time to print on both sides of one page takes longer than to print on a single side (simplex).

Polling mode 56 is used to determine polling when a job has been sent from the printer manager 2, i.e., departed from the port in the printer manager 2, but has not yet started printing or has not yet been registered at the printer 4. For instance, the print job may be queued in print queue and waiting to print. Alternatively, in SNMP embodiments, the print job may not have been registered in the Management Information Base (MIB) database in the printer 4. In either case, the print job has not started printing. Thus, there is no need to monitor at the frequency of a page-by-page basis monitoring, as with polling mode 54. The values for polling mode 56 may be a ratio of the polling mode 54 that reduces the values for polling mode 54. Alternatively, the values in polling mode 56 may be set to the time for the specific printer 4 to pull paper from the tray and send to the paper bin. The columns for polling mode 56 show the time to feed the paper from the printer 4 tray to the paper bin, e.g., 11 seconds. Still further, this value to feed paper from the tray may be used as a minimum polling interval in conjunction with some other method for determining time values. The value to feed and print may thus provide a floor to another method used for calculating the polling interval. For instance, the "Below Average" and "Low" columns for polling mode 56 show polling modes that are different from the three previous values for polling mode 56. This means that the function for calculating these two last values produced values greater than the feed time. However, the function produced time values for the first three columns less than the feed time, thereby causing the minimum feed time or floor of 11 seconds to override the calculated value in the first three columns for polling mode 56.

The tuning control critical alert 58 poll is used to determine printer status after the print monitor 12 is notified of a critical alert, such as a printer 4 jam, cover open, etc. In certain cases, the print monitor 12 may be alerted of a problem with the printer 4, but will not subsequently be notified when the problem is corrected. In such cases, even if traps are provided, they would not alert the print monitor 12 of a correction to the problem. Thus critical alert polling polls the printer 4 after a critical alert message has been received. This value may be independent of the printer 4 and the other values concerning the print operations, such as in polling mode 54. Further, this polling value may be less, i.e., a less frequent value, than the other values, because the time to correct critical alert problems, such as changing toner, closing the cover, etc., typically requires more time than printing pages, etc. Moreover, the critical alert polling may apply regardless of whether traps are used.

Polling mode 60 is used to determine the frequency of polling the printer 4 if a trap has not been received while there is no active print job. If a trap or message is not received after the predetermined time indicated in the polling mode 60, then the print monitor 12 will query the printer 4 to learn the cause of the lack of response. Polling mode 61 is similar to polling mode 60, except that polling mode 61 indicates the time to poll if no message has been received during the pendency of an active print job. Preferably, the value for polling mode 61 is higher than polling mode 60, i.e., polling will occur more frequently during the pendency of a printer job. The reason for this difference is that more responses are typically sent while a job is active, as opposed to inactive, thereby requiring more frequent monitoring.

The above embodiments used the user's frequency of monitoring selection to determine polling time intervals. However, the frequency of monitoring selection could also be used to determine other types of values, such as a threshold number of incidents, that are used to control when an event occurs. For instance, polling mode 62 provides a number of consecutive polls without a change before the print monitor 12 will enter the slow poll mode state. Thus, the user selected frequency of monitoring is used to determine a number of instances of polling without status change. If the print monitor 12 determines that status has not changed at a printer after the number of polls specified, then an assumption is made that access levels are at a low rate for that printer, such as is the case during night or other low use periods. If the status has not changed, then in preferred embodiments, the print monitor 12 will alter how threads are assigned to execute print monitor 12 operations. When polling outside of slow mode, there is preferably one thread per printer being monitored. During slow mode, to conserve thread resources, a single thread will be assigned to execute print monitor 12 operations with respect to all printers in slow mode. Thus, if there are some printers in slow mode and others not in slow mode, than a separate thread will be assigned for print monitor 12 operations with respect to each printer not in slow mode, and a single thread will be assigned to the printers in slow mode.

Polling mode 64 is another example of the use of the user selected frequency monitoring setting to determine a non-time value to control print monitor 12 operations. Polling mode 64 provides a number of job polls that occur before a printer poll is performed when the user has selected a level of printer monitoring including both jobs and printer. For instance, during job polling, the print monitor 12 does not need to regularly poll the printer 4 to determine status. However, after a certain number of consecutive job polls, the print monitor 12 would want to poll the printer to determine printer status information that is not obtained from a job poll.

In some cases, the user selected frequency of monitoring may not alter the value used for polling. For instance, a non-time threshold value used to determine polling is the job cancel handle 66 which has a single value regardless of the user selection of frequency monitoring. If the print monitor 12 cancels a job at the print manager 2 and the print job has not yet started at the printer 4, then the printer 4, upon receiving a command from the printer manager 2, cannot cancel the job as the job has not yet been received. The printer 4 may be busy with jobs and unable to select the newly submitted job. The value in tuning control 66 indicates the number of cancel attempts the printer manager 12 will retry to cancel the request.

In summary, table 50 includes tuning control values corresponding to each of the frequency of monitoring settings the user may select in the GUI 20 (FIG. 2a). Once the user selects a general frequency monitoring value in the GUI panel 20, then the corresponding values are determined from the table 50 to determine polling intervals in different situations. Further, the polling intervals in the table 50 for each tuning control item may incorporate the capabilities of the printer, i.e., paper feeding and page per minute capabilities, in selecting appropriate values for the tuning controls. Moreover, once an "Average" value for certain tuning controls are selected, based on system and printer 4 capabilities and other constraints, such as network constraints, then the other values below and above "Average" may be derived as a percentage of the Average values.

Figure 4:
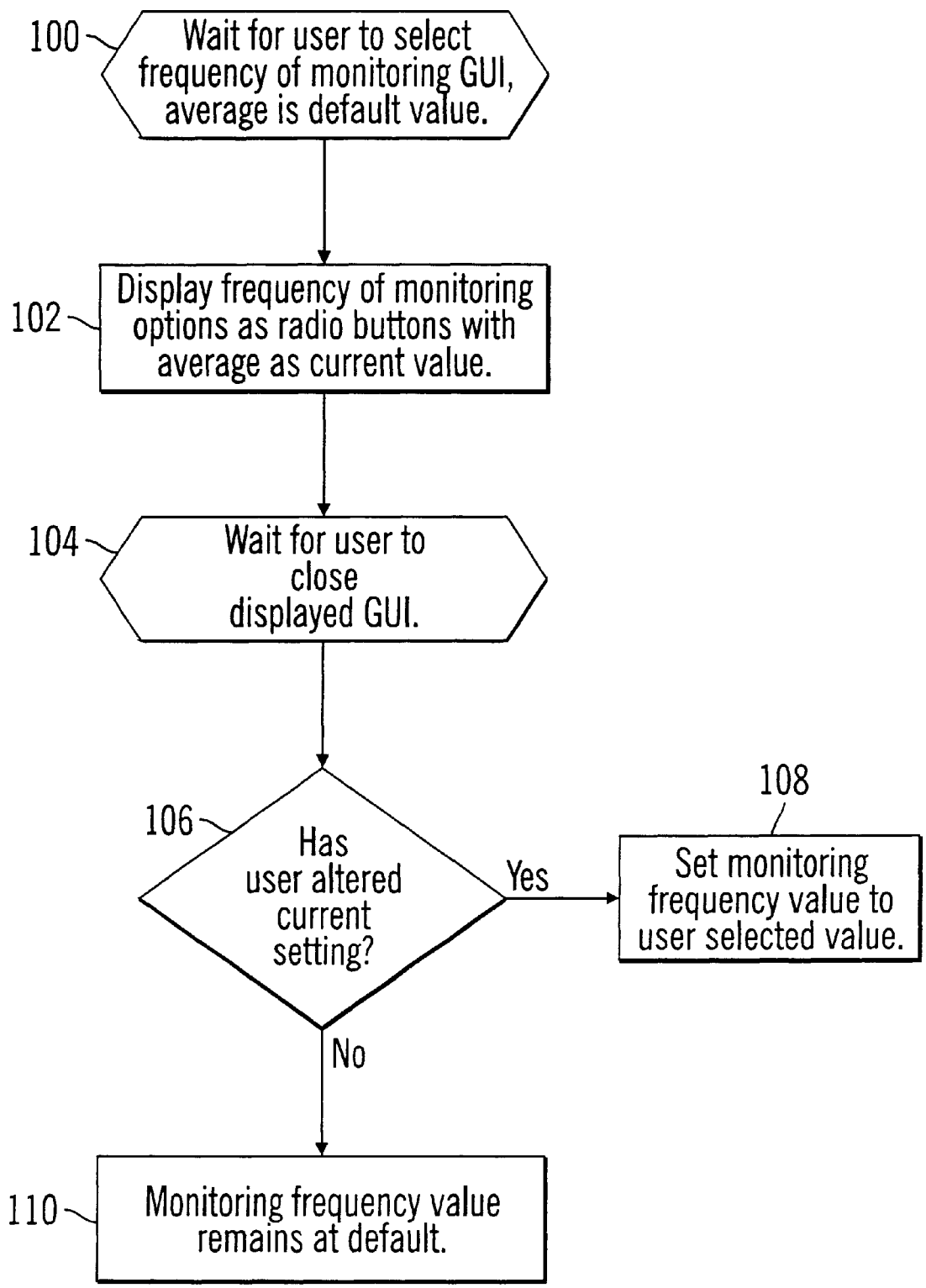
FIG. 4 illustrates logic for a user to select a frequency monitoring value in accordance with preferred embodiments of the present invention.

FIG. 4 illustrates logic implemented in the print monitor 12 for receiving user selections of general settings that the print monitor 12 uses to determine the polling intervals to use for specific print monitor operations. Control begins at block 100 with the user selecting with an input device to display on the monitor 10 the GUI panel 20 (FIG. 2a) including options. The print monitor 12 then displays in the GUI panel 20 (at block 102) radio buttons 22 corresponding to different general levels of monitoring frequency. The print monitor 12 then waits (at block 104) for the user to close the GUI 20 by selecting either the "OK" or "CANCEL" pushbuttons. If the user had selected the "CANCEL" pushbutton then any changes the user made to previous settings would be deleted and the previous settings would be used. If the "OK" pushbutton is selected, the print monitor 12 then determines (at block 106) whether the user altered the current value for the monitoring frequency, which may be the "Average" setting. The print monitor 12 would generate the average values for the different tuning controls 52–66 based on the capabilities of the printer. The settings other than "Average," i.e., "High," "Above Average," "Below Average," "Low," may then be determined as a percentage of the calculated "Average" value.

If the user altered the current settings for the monitoring frequency with the panel 20, then the print monitor 12 would set (at block 108) the monitoring frequency level to the user selected level. Otherwise, the monitoring frequency level would remain (at block 110) the current value. The print monitor 12 may set the initial current value for the monitoring frequency level to "Average."

The logic of FIG. 4 would similarly apply to the selection of the setting for the level of monitoring, which the user may set using the GUI panel 30 in FIG. 2b. The default monitoring level may be set to "Printer and page-by-page job status," and the user may alter the setting by selecting one of the radio buttons 32 in the GUI panel 30.

Figure 5:
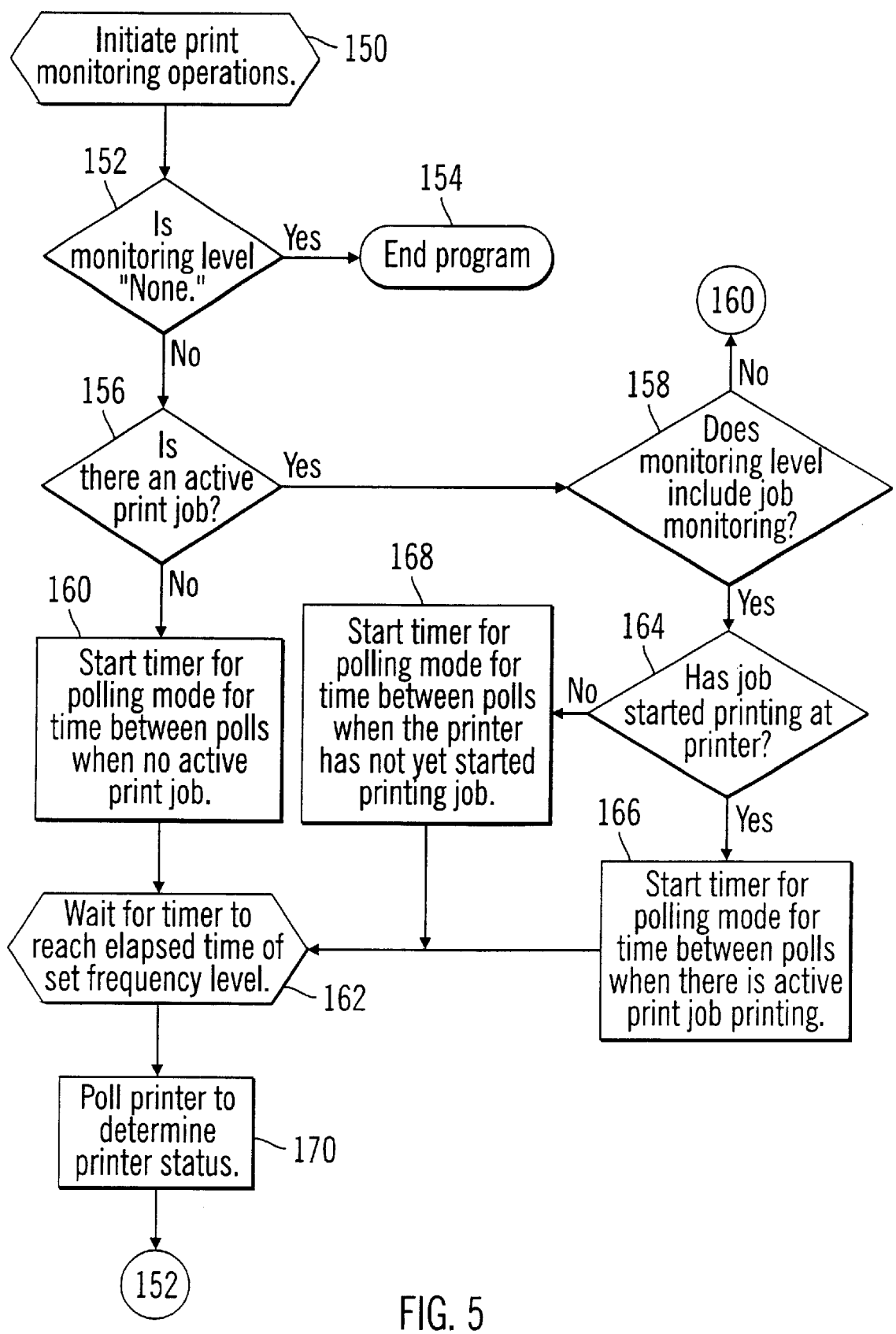
FIG. 5 illustrates logic to utilize the user selected frequency and level monitoring values in accordance with preferred embodiments of the present invention.

FIG. 5 illustrates logic implemented in the print monitor 12 to determine the amount of time between polls to determine printer and/or job status. Control begins at block 150 where the print monitor 12 initiates monitoring operations. The print monitor 12 determines (at block 152) whether the level of monitoring the user selected in GUI panel 30 is "None," i.e., no printer or job monitoring. If the level of monitoring is "None," then the program ends (at block 154) as no monitoring is specified. Otherwise, if the user has specified a level of monitoring, i.e., monitoring level is not "None," then according to the available setting options in panel 30, there is at least printer status monitoring. If the monitoring level is not "None," then the print monitor 12 determines (at block 156) whether there is an active print job. If so, control transfers to block 158; otherwise, the print monitor starts (at block 160) the timer for the polling mode 52 when there is no active print job. If the monitoring includes print job monitoring, then the print monitor 12 determines (at block 164) whether the printer 4 is currently printing the print job. If so, the print monitor 12 starts the timer (at block 166) for the polling mode 54 when there is an active print job. As discussed the user selected level value may vary depending on whether the print job is duplex or simplex. Further, the polling interval may vary depending on the monitoring level the user selected in GUI panel 30, i.e., "Printer status and job completion" or "Printer and page-by-page job status." The polling would be less frequent if the print monitor was only monitoring for job completion and more frequent if monitoring on a page-by-page basis. Otherwise, if the printer 4 has not started printing the job, the print monitor 12 starts the timer (at block 168) for the polling mode 56 if the job is not at the printer. If, at block 158, the monitoring level does not include job monitoring, then control transfers to block 160 as if there is no active job.

After starting the timer for the particular polling mode 52, 54, and 56 that is applicable, the print monitor 12 waits (at block 162) for the timer started at block 160, 166 or 168 to reach the elapsed time specified by the polling mode 52, 54, 56. Any time measuring mechanism known in the art may be used, including clocks measuring a time period by number of elapsed cycles. After the set time has elapsed, the print monitor 12 polls (at block 170) the printer 4 to learn of the printer and/or job status. At block 170, the level of monitoring, i.e., print status only, print and job page completion status, print and job completion status, determines the types of monitoring action. For instance, if the user selected the Printer status only monitoring level, then the print monitor 12 at block 170 would only poll for printer status. If the user selected job and printer monitoring, then jobs would be polled if there is an active print job. Otherwise, if there is no active print job, then only the printer status would be polled. Further, if the Polling Mode 64 is used, then the printer status would be polled after a threshold number of job status polling operations, determined according to the user selected frequency of monitoring. From block 170, control returns to block 152.

In this way, depending on the selection made by the user, a monitoring frequency is selected for a level of monitoring, i.e., print job and/or printer status, selected by the user. This allows the user to make a general selection that will provide tradeoffs of decreased network traffic versus up-to-date status information. The print monitor 12 takes the user's selected generalized values and propagates such values into specific setting values for various polling modes 52–66.

Preferred embodiments thus provide a mechanism to allow a user at a high level to select a primary monitoring goal, i.e., increased monitoring frequency to improve timeliness of status information versus decreasing network traffic. From the high level value the user selects, the print monitor 12 would then calculate the appropriate specific polling values to use to accomplish the monitoring goal the user has selected.

Conclusions and Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to monitoring the status of a printer or print jobs at the printer. However, the preferred status monitoring embodiments may apply to monitoring any aspect of any type of device attached to the network or computer, where the computer functions as the managing device and the managed object that is monitored may be any device known in the art capable of connecting to the computer directly, e.g., a parallel port or serial port, or through a network, such as an Intranet or the Internet. For instance, preferred embodiments could apply to monitoring facsimile machines, copiers, telephones, display devices, input/output devices, storage devices, communication systems, etc., in communication with the network system.

Preferred embodiments provided the user specific levels of monitoring and frequency to select. However, in further embodiments, the user may be offered the selection of different monitoring levels and frequencies than those described in the preferred embodiments. Further, there may be more or less frequency and level monitoring options than the number shown in FIGS. 2a, b. Still further, the user may enter a value for frequency and level monitoring, such as between 1 to 10, which the print monitor 12 may then use as a weight or ratio to calculate the actual polling intervals for tuning controls 52–66.

Preferred embodiments described specific polling mode settings that may be affected by the user. However, the preferred embodiment applies to any specific setting that the user can affect by selecting a generalized performance value to satisfy a user selected goal, i.e., less or more network traffic and less or more timeliness of status information,. This generalized user setting is then used to calculate the value for specific operational values, such as polling intervals, that affect the performance of the desired parameters of network traffic and timeliness of status information.

The GUI panels in FIGS. 2a, b are for illustrative purposes. Graphical design elements and GUI functions may be added and removed without departing from the invention.

The logic of FIGS. 4 and 5 is preferably implemented within the printer monitor application. However, various functions may be implemented in different application programs or in the operating system of the printer manager. This logic is for illustrative purposes. Additional or alternative steps may be performed in addition to those illustrated in the logic. Further, the order of the steps in the preferred logic may also vary.

In preferred embodiments, the printer monitor 12 is implemented in an object oriented design program such as JAVA, C++, or non-object oriented languages, such as Basic, Pascal, FORTRAN, etc.**

**AIX and OS/2 are registered trademarks of IBM and OS/390 and MVS are trademarks of IBM; WINDOWS is a registered trademark of Microsoft Corporation; UNIX is a registered trademark licensed by the X/Open Company LTD; JAVA is a trademark of Sun Microsystems, Inc.; Linux is a trademark of Linus Torvalds.

In summary, preferred embodiments disclose a disclose a method, system, and program for determining monitoring settings for a computer monitoring a device. A set of monitoring frequency values is provided for a user to select. A user selected monitoring frequency value is received and used to determine at least one polling interval that defines a period between polling operations from the computer to the device. The polling interval value is a different value from the user selected monitoring frequency.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining monitoring settings for a computer monitoring a device, comprising:
   providing a set of monitoring frequency values for a user to select;
   receiving a user selected monitoring frequency value; and
   using the user selected monitoring frequency value to determine at least one polling interval value that defines a period between polling operations from the computer to the device, wherein the polling interval value is a different value from the user selected monitoring frequency value.

2. The method of claim 1, wherein the polling interval value is one of a time period and a threshold number of instances of an event.

3. The method of claim 1, further comprising:
   determining a base polling interval value that corresponds to a base monitoring frequency value in the set; and
   determining a separate polling interval value for each monitoring frequency value in the set, other than the base monitoring frequency value, wherein the polling interval value corresponding to the selected monitoring frequency value is used to determine the period between polling operations.

4. The method of claim 3, further comprising using the base polling interval value in a calculation to determine the polling interval values corresponding to the monitoring frequency values other than the base monitoring frequency value.

5. The method of claim 4, wherein the polling interval value are calculated as a proportion of the base polling interval value.

6. The method of claim 3, wherein the base polling interval value is dependent on processing capabilities of the device.

7. The method of claim 1, wherein there are multiple polling interval types associated with different operational states, and wherein different polling interval value are associated with different polling interval types, further comprising:
   determining an operational state with respect to the computer and device; and
   determining the polling interval type corresponding to the determined operational state, wherein determining the polling interval value comprises determining the polling interval value for the polling interval type.

8. The method of claim 7, wherein a first operational state comprises an active job sent to the device that is being processed, a second operational state comprises an active job sent to the device that is not being processed, and a third operational state comprises no active job sent to the device, and wherein the polling interval value for the third operational state is greater than the polling interval value for the second operational state and the polling interval for the second operational state is greater than the polling interval value for the first operational state.

9. The method of claim 8, wherein for each polling interval type there is a separate polling interval value for each monitoring frequency value in the set.

10. The method of claim 7, wherein a first operational state comprises not receiving traps from the device when there is no active job at the device and a second operational state comprises not receiving traps from the device when there is an active job at the device, and wherein the polling interval value for the second operational state is greater than the polling interval value for the first operational state.

11. A method for determining monitoring settings for a computer monitoring a device, comprising:
   providing a set of monitoring frequency values for a user to select;
   providing a set of monitoring level values for the user to select indicating different types of polling operations to perform;
   receiving a user selected monitoring frequency value;

receiving a user selected monitoring level value;

using the user selected monitoring frequency value to determine at least one polling interval value that defines a period between polling operations from the computer to the device, wherein the polling interval value is a different value from the user selected monitoring frequency value; and using the user selected monitoring level value to determine the polling operations to perform at the determined polling interval value.

12. The method of claim 11, further comprising using the monitoring level value to determine the polling interval value.

13. The method of claim 1, wherein the device is a printer, wherein the polling interval value comprises a number of instances of monitoring a print job sent to the printer, further comprising polling the printer to determine printer status after polling the printer for print jobs a number of times equal to the polling interval value.

14. The method of claim 1, wherein the polling interval value comprises a number of consecutive polls for device status, further comprising;

using one thread to monitor status for each device;

determining whether the status of the device has not changed for the previous consecutive polls equal to the polling interval value; and using one thread to monitor the status for those devices whose status has not changed for the previous consecutive polls equal to the polling interval value.

15. A system for determining monitoring settings to monitor a device, comprising:

a computer in communication with the device; and program logic executed by the computer, comprising:

(i) means for providing a set of monitoring frequency values for a user to select;

(ii) means for receiving a user selected monitoring frequency value;

(iii) means for using the user selected monitoring frequency value to determine at least one polling interval value that defines a period between polling operations from the computer to the device, wherein the polling interval value is a different value from the user selected monitoring frequency value.

16. The system of claim 15, wherein the polling interval value is one of a time period and a threshold number of instances of an event.

17. The system of claim 15, wherein the computer utilizes the SNMP protocol to communicate with the device over a network.

18. The system of claim 15, wherein the program logic further comprises:

means for determining a base polling interval value that corresponds to a base monitoring frequency value in the set; and means for determining a separate polling interval value for each monitoring frequency value in the set, other than the base monitoring frequency, wherein the polling interval value corresponding to the selected monitoring frequency value is used to determine the period between polling operations.

19. The system of claim 18, wherein the program logic further comprises means for using the base polling interval value in a calculation to determine the polling interval values corresponding to the monitoring frequency values other than the base monitoring value frequency value.

20. The system of claim 18, wherein the program logic comprises means for calculating the polling interval values as a proportion of the base polling interval value.

21. The system of claim 18, wherein the base polling interval is dependent on processing capabilities of the device.

22. The system of claim 15, wherein there are multiple polling interval types associated with different operational states, wherein different polling interval values are associated with different polling interval types, and wherein the program logic further comprises:

means for determining an operational state with respect to the computer and device; and means for determining the polling interval type corresponding to the determined operational state, wherein determining the polling interval value comprises determining the polling interval value for the polling interval type.

23. The system of claim 21, wherein a first operational state comprises an active job sent to the device that is being processed, a second operational state comprises an active job sent to the device that is not being processed, and a third operational state comprises no active job sent to the device, and wherein the polling interval value for the third operational state is greater than the polling interval value for the second operational state and the polling interval value for the second operational state is greater than the polling interval value for the first operational state.

24. The system of claim 22, wherein for each polling interval type there is a separate polling interval value for each monitoring frequency value in the set.

25. The system of claim 21, wherein a first operational state comprises not receiving traps from the device when there is no active job at the device and a second operational state comprises not receiving traps from the device when there is an active job at the device, and wherein the polling interval value for the second operational state is greater than the polling interval value for the first operational state.

26. A system for determining monitoring settings to monitor a device, comprising:

a computer in communication with the device; and program logic executed by the computer, comprising:

(i) means for providing a set of monitoring frequency values for a user to select;

(ii) means for providing a set of monitoring level values for the user to select indicating different types of polling operations to perform;

(iii) means for receiving a user selected monitoring frequency value;

(iv) means for receiving a user selected monitoring level value;

(v) means for using the user selected monitoring frequency value to determine at least one polling interval value that defines a period between polling operations from the computer to the device, wherein the polling interval value is a different value from the user selected monitoring frequency value; and (vi) means for using the user selected monitoring level value to determine the polling operations to perform at the determined polling interval value.

27. The system of claim 26, wherein the program logic further comprises means for using the monitoring level value to determine the polling interval value.

28. The system of claim 15, wherein the device is a printer, wherein the polling interval value comprises a number of instances of monitoring a print job sent to the printer, and wherein the program logic further comprises means for polling the printer to determine printer status after polling the printer for print jobs a number of times equal to the polling interval value.

29. The system of claim 15, wherein the polling interval value comprises a number of consecutive polls for device status, and wherein the program logic further comprises:
   means for using one thread to monitor status for each device;
   means for determining whether the status of the device has not changed for the previous consecutive polls equal to the polling interval value; and
   means for using one thread to monitor the status for those devices whose status has not changed for the previous consecutive polls equal to the polling interval value.

30. An article of manufacture for use in determining monitoring settings for a computer monitoring a device, the article of manufacture comprising computer usable media including at least one computer program embedded therein that causes the computer to perform:
   providing a set of monitoring frequency values for a user to select;
   receiving a user selected monitoring frequency value;
   using the user selected monitoring frequency value to determine at least one polling interval value that defines a period between polling operations from the computer to the device, wherein the polling interval value is a different value from the user selected monitoring frequency.

31. The article of manufacture of claim 30, wherein the polling interval value is one of a time period and a threshold number of instances of an event.

32. The article of manufacture of claim 30, further comprising:
   determining a base polling interval value that corresponds to a base monitoring frequency value in the set; and
   determining a separate polling interval value for each monitoring frequency value in the set, other than the base monitoring frequency value, wherein the polling interval value corresponding to the selected monitoring frequency value is used to determine the period between polling operations.

33. The article of manufacture of claim 32, further comprising using the base polling interval in a calculation to determine the polling interval values corresponding to the monitoring frequency values other than the base monitoring frequency value.

34. The article of manufacture of claim 33, wherein the polling interval values are calculated as a proportion of the base polling interval value.

35. The article of manufacture of claim 32, wherein the base polling interval value is dependent on processing capabilities of the device.

36. The article of manufacture of claim 30, wherein there are multiple polling interval types associated with different operational states, and wherein different polling interval values are associated with different polling interval types, further comprising:
   determining an operational state with respect to the computer and device; and
   determining the polling interval type corresponding to the determined operational state, wherein determining the polling interval value comprises determining the polling interval value for the polling interval type.

37. The article of manufacture of claim 36, wherein a first operational state comprises an active job sent to the device that is being processed, a second operational state comprises an active job sent to the device that is not being processed, and a third operational state comprises no active job sent to the device, and wherein the polling interval value for the third operational state is greater than the polling interval value for the second operational state and the polling interval value for the second operational state is greater than the polling interval value for the first operational state.

38. The article of manufacture of claim 37, wherein for each polling interval value type there is a separate polling interval for each monitoring frequency value in the set.

39. The article of manufacture of claim 36, wherein a first operational state comprises not receiving traps from the device when there is no active job at the device and a second operational state comprises not receiving traps from the device when there is an active job at the device, and wherein the polling interval value for the second operational state is greater than the polling interval value for the first operational state.

40. An article of manufacture for use in determining monitoring settings for a computer monitoring a device, the article of manufacture comprising computer usable media including at least one computer program embedded therein that causes the computer to perform:
   providing a set of monitoring frequency values for a user to select;
   providing a set of monitoring level values for the user to select indicating different types of polling operations to perform;
   receiving a user selected monitoring frequency value;
   receiving a user selected monitoring level value;
   using the user selected monitoring frequency value to determine at least one polling interval value that defines a period between polling operations from the computer to the device, wherein the polling interval value is a different value from the user selected monitoring frequency value; and
   using the user selected monitoring level value to determine the polling operations to perform at the determined polling interval value.

41. The article of manufacture of claim 40, further comprising using the monitoring level value to determine the polling interval value.

42. The article of manufacture of claim 30, wherein the device is a printer, wherein the polling interval value comprises a number of instances of monitoring a print job sent to the printer, further comprising polling the printer to determine printer status after polling the printer for print jobs a number of times equal to the polling interval value.

43. The article of manufacture of claim 30, wherein the polling interval value comprises a number of consecutive polls for device status, further comprising;
   using one thread to monitor status for each device;
   determining whether the status of the device has not changed for the previous consecutive polls equal to the polling interval; and
   using one thread to monitor the status for those devices whose status has not changed for the previous consecutive polls equal to the polling interval value.

* * * * *

UNITED STATES PATENT AND TRADEMARK OFFICE
CERTIFICATE OF CORRECTION

PATENT NO. : 6,453,268 B1
DATED : September 17, 2002
INVENTOR(S) : Dennis Michael Carney, Linda Sue Liebelt and Ryan Hoa Nguyen It is certified that error appears in the above-identified patent and that said Letters Patent is hereby corrected as shown below:

Column 12,
Lines 23 and 30, delete "value" and insert -- values --

Column 13,
Line 64, after "monitoring" and before "frequency" delete "value"

Column 16,
Line 11, after "interval" insert -- value --

Signed and Sealed this

Ninth Day of August, 2005

JON W. DUDAS
*Director of the United States Patent and Trademark Office*